US010464256B2

United States Patent
Feil et al.

(10) Patent No.: US 10,464,256 B2
(45) Date of Patent: Nov. 5, 2019

(54) METHOD FOR FOLDING OVER AN EDGE OF A DECORATIVE LAYER AND FOLD-OVER SYSTEM

(71) Applicant: KIEFEL GmbH, Freilassing (DE)

(72) Inventors: Juergen Feil, Leobendorf (DE); Andreas Dandl, Laufen (DE)

(73) Assignee: KIEFEL GmbH (DE)

( * ) Notice: Subject to any disclaimer, the term of this patent is extended or adjusted under 35 U.S.C. 154(b) by 725 days.

(21) Appl. No.: 14/902,943

(22) PCT Filed: Aug. 8, 2014

(86) PCT No.: PCT/DE2014/000403
§ 371 (c)(1),
(2) Date: Jan. 21, 2016

(87) PCT Pub. No.: WO2015/018391
PCT Pub. Date: Feb. 12, 2015

(65) Prior Publication Data
US 2016/0144556 A1    May 26, 2016

(30) Foreign Application Priority Data

Aug. 8, 2013 (DE) ......................... 10 2013 013 152

(51) Int. Cl.
*B29C 53/40* (2006.01)
*B32B 3/04* (2006.01)
(Continued)

(52) U.S. Cl.
CPC .............. *B29C 63/04* (2013.01); *B29C 53/40* (2013.01); *B29C 53/84* (2013.01); *B32B 3/04* (2013.01);
(Continued)

(58) Field of Classification Search
None
See application file for complete search history.

(56) References Cited

U.S. PATENT DOCUMENTS 8,741,080 B2    6/2014  Aussermeier
2012/0263907 A1  10/2012  Schilles et al.

FOREIGN PATENT DOCUMENTS

DE            43 08 925 A1    2/1995
DE           198 40 957 A1    3/2000
DE        10 2010 003 440 A1  10/2011

OTHER PUBLICATIONS

Chinese Office Action in CN 201480037520.8 dated Mar. 9, 2018.
International Search Report of PCT/DE2014/000403, dated Nov. 18, 2014.

*Primary Examiner* — Barbara J Musser
(74) *Attorney, Agent, or Firm* — Tarolli, Sundheim, Covell & Tummino LLP

(57) ABSTRACT

A method for folding over an edge of a decorative layer, a fold-over system, a method for converting a fold-over system, and an interior trim part. To reduce cycle times and to achieve excellent quality of the produced laminated parts at the same time, a method is provided wherein the fold-over slide for fixing the edge of the decorative layer is cooled by means of an active cooling means. Alternatively or cumulatively, the fold-over slide according to the invention is heated by means of an active heating means. In a preferred embodiment, a heating fluid flows through the fold-over slide when the fold-over slide is already pressing the adhesive into the adhesive joint, such that the hot-melt adhesive is activated. Then, under persistent contact pressure, the fold-over slide is cooled until fixation occurs. Then the fold-over slide is removed, and the carrier part can be exchanged.

25 Claims, 3 Drawing Sheets

Figure 1:
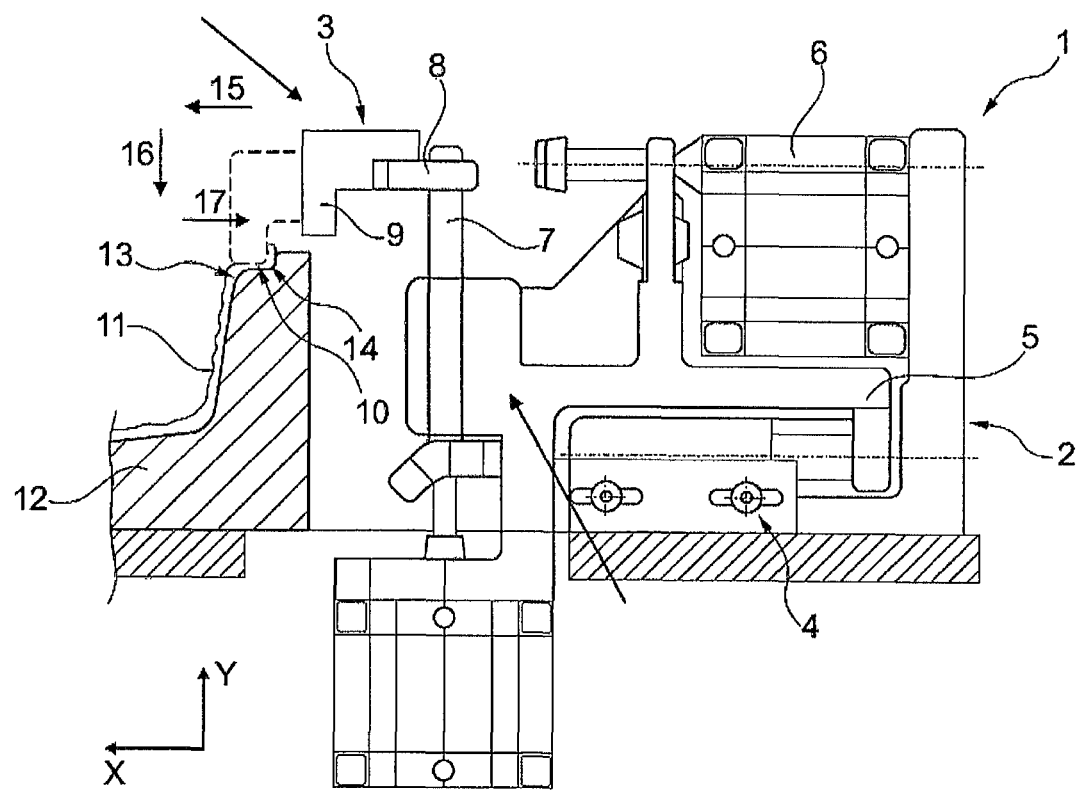

(51) Int. Cl.
    *B32B 3/06*         (2006.01)
    *B29C 63/04*       (2006.01)
    *B29C 53/84*       (2006.01)
    *B32B 3/30*         (2006.01)
    *B32B 7/14*         (2006.01)
    *B29L 9/00*         (2006.01)
    *B29L 31/30*       (2006.01)

(52) U.S. Cl.
    CPC ................. *B32B 3/06* (2013.01); *B32B 3/30* (2013.01); *B32B 7/14* (2013.01); *B29L 2009/00* (2013.01); *B29L 2031/3041* (2013.01); *B32B 2250/02* (2013.01); *B32B 2255/00* (2013.01); *B32B 2451/00* (2013.01); *B32B 2605/08* (2013.01)

METHOD FOR FOLDING OVER AN EDGE OF A DECORATIVE LAYER AND FOLD-OVER SYSTEM

CROSS REFERENCE TO RELATED APPLICATIONS

This application is the National Stage of PCT/DE2014/000403 filed on Aug. 8, 2014, which claims priority under 35 U.S.C. § 119 of German Application No. 10 2013 013 152.9 filed on Aug. 8, 2013, the disclosure of which is incorporated by reference. The international application under PCT article 21(2) was not published in English.

The invention relates to a method for the edge folding of a rim of a decorative layer, an edge-folding system, a method for the retrofitting of an edge-folding system and an interior trim part for a motor vehicle.

In general, the present invention relates to methods and devices as well as components manufactured therewith that can be used in the interior space of land vehicles, watercraft and aircraft, but especially to the components for the interior space of conventional passenger cars. Purely by way of example, interior trim parts of the area of the doors, dashboards, glove boxes or center consoles fall within this category.

Corresponding parts are generally produced with a method in which a preferably flexible material layer with an upper side and an underside is laminated onto a preferably dimensionally stable substrate with a preferably three-dimensional surface contour.

For the manufacturing of substrate parts laminated with a flexible decorative layer, a distinction between the so-called vacuum laminating (also known as film laminating) and the so-called press laminating is primarily made in the prior art.

In the vacuum laminating, plastic films are as a rule laminated as flexible material layers onto substrate part by application of vacuum. A plastic applied onto the substrate and/or the flexible material layer is used for the bonding between the substrate and the flexible material layer.

The material layer itself usually has a decoration, in which case leather-like grains are very popular.

The press laminating is used as a rule for the processing of flexible material layers which either are not amenable to vacuum, such as textiles, for example, or which are not stretchable or are so to only a limited extent, such as leather or imitation leather, for example. In such cases the substrate and the flexible material layer, which are inserted into the tool, are pressed in a predefined press gap or joined in other manner. In this method also, the bonding of the elements is achieved by adhesive applied onto the substrate and/or the flexible material layer.

Frequently a thermally activatable adhesive, which was applied beforehand onto one or both elements, is used for the bonding of the two elements. This adhesive must be activated before or during the laminating. The thermally activatable adhesive may be, for example, a hot pick-up gum, also known as hot melt, although other thermally activatable adhesives may also be used, for example dispersed polyurethanes.

This can take place by heating the laminating tools or their mold halves, so that the adhesive in the adhesive joint between the substrate part and the flexible decorative layer is activated by contact of the substrate part and the flexible decorative layer with the heated mold. For this purpose the heating takes place via a simultaneous heating of the substrate part and of the flexible decorative layer.

Alternatively, it is known to heat the adhesive layer before the bringing together of substrate part and flexible decorative layer, for example via hot air or infrared.

In some cases it may be necessary, because of a weak initial adhesion between the elements, to lower the joint temperature in the joint between the flexible machine layer and the substrate layer rapidly by the cooling of one or both tools.

DE 10 2010 003 440 A1 proposes using carbon nanotubes with a very direct response behavior as the heating device for the heating of the adhesive directly in the adhesive joint.

The task of the present invention is to provide an improvement of or an alternative to the prior art.

According to a first aspect of the present invention, a method for the edge folding of a rim of a decorative layer around an edge of a substrate part accomplishes this task, wherein an edge-folding slide is used for the edge folding and a fixing means is used to fix the edge of the decorative layer in an adhesive joint in the edge-folded condition, wherein the method is characterized in that the edge-folding slide for the fixing of the rim of the decorative layer is cooled by way of an active cooling means.

The terms used here are explained in the following:

The "decorative layer" may comprise above all film, cloth, fabric, leather, imitation leather, fleece and the like.

The "edge folding" will be above all a folding-over movement by 90° or by 180°, although other values may be relevant in the individual case, albeit above all values greater than 90°.

The "substrate part" may be of any desired nature. In particular, however, it is part of an interior trim of a motor vehicle, such as, for example, an aircraft or a passenger car or truck.

The "edge-folding slide" is very important for the present invention: It characterizes a class of edge-folding systems in which the edge folding takes place not over the full surface by pressing into a tool but in which individual, discrete elements, namely the edge-folding slides, grip the rim of the decorative layer to be turned down and then by a multi-dimensional movement fold the rim of the decorative layer around the edge of the substrate part and press it there for the fixing. In the normal case, an edge-folding slide is supported in such a way that has at least two different movement axes. Often these are on the one hand a vertical stroke and on the other hand a horizontal extension movement, although in practice other alignments may be encountered, but the predictability of the movements is easiest when the at least two degrees of freedom, for example, differ from one another by 90°.

The "fixing means" may be above all an adhesive. Within the group of the adhesives, above all thermally activatable adhesives are envisioned, for example dispersed polyurethanes or hot melts, wherein hot melts are also referred to often in the language of the art as melting adhesive, hot adhesive, hot pick-up gum or hot glue. Hot adhesives are usually solvent-free and at room temperature more or less solid products, which are activated in the hot condition and are applied on the adhesive surface or may already be present there and upon cooling form a permanent bond. In particular, various basic polymers, such as polyamides, polyethylene, amorphous polyalphaolefins, ethylene/vinyl acetate copolymers, polyester elastomers, polyurethane elastomers, copolyamide elastomers or vinyl acetate copolymers may be considered, or resins or waxes, wherein stabilizers or nucleation agents may often be admixed.

An "active" cooling means should be understood as one such that selectively removes thermal energy from the edge-folding slide and is used specially for this purpose. In this context it must be treated as a part of the edge-folding system. Above all, it is envisioned that the active cooling means has a pump and a cooling fluid, above all a liquid, wherein gaseous cooling means also come into consideration, although liquid cooling means usually permit a higher cooling capacity.

A preferred embodiment provides that the edge-folding slide is cooled from its inside outward by way of the cooling means.

For a cooling from the inside of the edge-folding slide outward, the thermal conductivity of the tool of the edge-folding slide is used. This may be a metal, above all a metal with a high thermal conductivity, especially with a higher thermal conductivity than stainless steel or steel, but in any case preferably with a higher thermal conductivity than approximately 40 to 58 W/(m×K), which corresponds approximately to steel, than approximately 240 to 400 W/(m×K), which corresponds approximately to copper, more than approximately 200 to 240 W/(cm×K), which corresponds approximately to aluminum, respectively at 0° C. ambient temperature. When elements with very high thermal conductivity of more than 1000 W/(m×K), such as carbon nanotubes with approximately 6000 W/(m×K) thermal conductivity, for example, are disposed at least in one part of the edge-folding slide, then a greater configuration freedom exists for the construction as regards the size and shape of the edge-folding slide and the position and cooling capacity of the cooling means.

Constructively it is proposed that the cooling means has an open or closed channel on or in the edge-folding slide and use it in order to convey a fluid through the channel and/or to arrange conduction in some other way. For example, it may be envisioned that an electrical conductor in the form of a wire is disposed in the channel, in which case it is even possible at the same time to pass a fluid, such as a cooling fluid, for example.

If a cooling fluid is pumped through the edge-folding slide, then the edge-folding slide can be flowed through by the cooling fluid and thereby cooled. It can then be very easy to exert influence on the cooling capacity by way of a regulator or of a simple controller.

At this place it is pointed out that, in the scope of the patent application presented here, no absolutely sharp distinction is made linguistically between controlling and regulating. Whenever the controlling is mentioned, the regulating is also disclosed as a special case; whenever the regulating is mentioned, a controlling is also disclosed as an embodiment, which sometimes may be inferior.

Moreover, it is expressly pointed out that, in the scope of the patent application presented here, indefinite articles such as "one", "two", etc. should be understood respectively as minimum values, i.e. as "at least one . . . ", "at least two . . . ", etc., unless it follows from the respective context that, for example, only "exactly one . . . ", "exactly two . . . ", etc. is intended as the meaning.

In order in particular to allow a hot melt to cool well and to develop a fixing effect as a result of the cooling, it is proposed that the edge-folding slide first be cooled to below 40° C., preferably to below 30° C., above all to below 25° C., before it is removed from the edge-folded rim of the decorative layer.

This takes place particularly easily when a cooling regulating circulation is provided and the cooling means is regulated with respect to its amount and/or its flow and/or its cooling capacity and/or its cooling position, such as the position of the flow through the tool, for example.

A cooling fluid can be used very easily in a regulator, and the return-flow temperature of the cooling fluid can be measured as the regulating value, for example when the cooling fluid emerges from the tool, above all emerges from a channel bore through the tool and, for example, reenters a hose or the later path, albeit before reentry into the tool. In practice, it has been shown in experiments of the inventor that the return-flow temperature of the cooling fluid is regulated preferably to below 40° C., above all to below 30° C., preferably to below 25° C., in practice particularly preferably to approximately 20° C.

According to a second aspect of the present invention, a method, especially a method such as described in the foregoing, for the edge-folding of a rim of a decorative layer around an edge of a substrate part, accomplishes the stated task, wherein an edge-folding slide is used for the edge folding and a holding means is used to fix the edge of the decorative layer in the edge-folded condition in an adhesive joint, wherein the method is characterized in that the edge-folding slide is heated by way of an active heating means for the edge folding and/or for the fixing of the rim of the decorative layer.

The particular attraction of implementation of such a method consists in the fact that the edge-folding slide is heated, and so the thermal energy can therefore be used selectively in the edge-folding slide and the places contacted by the edge-folding slide on the rim to be edge-folded of the decorative layer. This leads directly to a more selective use of the applied thermal energy. In particular, however, it is also possible to implement the method in such a way that the thermally activatable adhesive is activated by the heater only in the pressed condition in the adhesive joint with edge-folded rim.

As already explained in the foregoing with respect to the cooling, it likewise makes sense to heat the edge-folding slide by way of the heating means from its inside outward, in which case it is also proposed here that the heating means has an open or closed channel in the edge-folding slide.

If a fluid is used, then it is proposed that this be pumped through the edge-folding slide, so that the edge-folding slide is flowed through by the heating fluid and thereby heated.

Alternatively or cumulatively, heating wires or other electrically activatable thermal energy generators or, for example, magnetic thermal energy generators, may be used.

In order to improve the heat transfer between the cooling means and/or the heating means and the edge-folding slide at its surface of contact with the rim to be turned down, it is proposed that a metal structural element be used as the edge-folding slide.

This does not necessarily mean that the entire edge-folding slide must be made of metal. However, it is proposed that an insulation-free connection be established from the point of action of the heating and/or cooling means to the designated surface of contact with the rim to be edge-folded.

In experiments of the inventor, it has been found that the metal structural element of the edge-folding slide preferably comprises copper and/or beryllium, above all an alloy of these two materials.

The edge-folding slide may be formed in one piece with an open or closed channel, wherein the expression "in one piece" refers to the stretch from the channel to the designated gripping surface on the rim of the decorative layer.

In a particularly advantageous method, a heating fluid and a cooling fluid are provided and are pumped in alternation through the same channel or through two channels on or in the edge-folding slide, in order to heat the edge-folding slide and thus the rim of the decorative layer and then to cool them in alternation.

If the hot melt is to be activated first in the adhesive joint with edge-folded rim of the decorative layer, then the following steps are proposed for a corresponding edge-folding method:
  a) edge-folding of the rim and pressing of the rim against the substrate part by way of the edge-folding slide;
  b) activation of the heating means for the heating, above all of the edge-folding slide, and thereby for the activation of hot melt in the adhesive joint;
  c) holding of the rim in the pressed condition of the thermally activatable adhesive;
  d) activation of the cooling means for the cooling of the edge-folding slide and thus for the cooling of the adhesive, so that this fixes the edge-folded rim to the substrate part; and
  e) detaching of the edge-folding slide from the rim fixed on the substrate part.

In such a method sequence, greatest possible safety exists against the inadvertent distribution of adhesive, for example on visible parts of the workpiece, and in fact independently of whether the heating means is used for the heating of the edge-folding slide and thus indirectly of the hot melt or of whether a heating device, for example as conventionally known, is used to heat the edge-folded rim and/or the substrate part in the region of the adhesive joint or whether, as known from DE 10 2010 003 440 A1, the adhesive joint is directly heated from inside outward.

The edge folding of the rim may take place at a temperature level at the point of contact with the edge-folding slide below an activation temperature of the hot melt.

The heating may take place during exertion of the pressure of the edge-folding slide on the rim and especially on the adhesive on the substrate part. It will be understood that a slight decrease in cycle time may be achieved when the heating already takes place before the application of the pressing pressure in the position to be fixed.

By analogy with these considerations, it may be advantageous if the cooling takes place during exertion of the pressure of the edge-folding slide on the rim and especially on the adhesive on the substrate part.

In order to be able to perform an advantageous method, according to a third aspect of the invention presented here an edge-folding system for the edge folding of a rim of a decorative layer around an edge of a substrate part is proposed, wherein an electromechanically driven edge-folding slide is provided for the edge folding and the edge-folding system is set up to use a fixing means for fixing the edge of the decorative layer in an adhesive joint in edge-folded condition, wherein the edge-folding system is characterized in that is has an active cooling means for the edge-folding slide and is set up to cool the edge-folding slide for the fixing of the edge of the decorative layer by way of the active cooling means.

If a cooling fluid is provided, then it is preferably passed in a cooling circulation.

If a heating fluid is provided, then it is preferably passed in a heating circulation.

If a heating circulation and a cooling circulation are provided, then it may be practical, depending on configuration of the system, to connect the cooling circulation and the heating circulation in series. By this it will be understood that the cooling circulation and the heating circulation in any case have a split channel piece inside the edge-folding slide, preferably flow through the edge-folding slide via the same channel.

Outside the edge-folding slide or at least outside the common channel piece in the edge-folding slide, a common piece of line may likewise be provided, or else the at least largely predominant part of the line, is even used jointly, i.e. is flowed through either by the cooling circulation or by the heating circulation.

In another system configuration it may be practical to provide the heating circulation and the cooling circulation in parallel, which means that at least the largest part of the line route outside the edge-folding slide for the cooling circulation is constructed separately from the heating circulation, wherein partly or even completely separated lines, above all in the form of channels, may be provided even within the edge-folding slide.

The edge-folding slide may have an electrically and/or magnetically activatable heating element, wherein in this case the edge-folding system is preferably set up to activate the heating element for the edge folding and/or for the fixing. Electrically an/or magnetically activatable heating elements are known from the prior art. They may be used, for example, when the channel route through the edge-folding slide is to remain available for the cooling circulation, but nevertheless a heating means is to be provided on the edge-folding slide without it being absolutely necessary to dispose a further channel in the edge-folding slide.

As regards the channels, it should be explained that they may be disposed in the most diverse paths in the edge-folding slide. In the simplest case, a straight-path channel in the form of a simple bore through the edge-folding channel is provided. An exemplary alternative form may be a U-channel, wherein this preferably is composed of several respectively straight individual bores, in the case of a U-section preferably of three individual bores, namely respectively one bore for each leg of the U.

In order to be able to heat regions of the rim to be edge-folded of the decorative layer distant from the discrete action points of the edge-folding slide, a hot-air system may be provided and set up to direct a hot-air stream onto a designated rim region of a substrate part taken up for edge folding and/or of a rim to be edge-folded of a decorative layer, especially with a multiplicity of discrete hot-air outlet openings and/or disposed substantially in the shape of the substrate-part contour. This is known from the prior art, for example from the current edge-folding systems of the Applicant. A three-dimensional heating channel adapted to the structural-part contour ensures a defined uniform heating of the substrate part there for the activation of the adhesive. In combination with the invention presented here, a particular advantage is achieved.

As heating means for the rim and/or an adhesive in an adhesive joint, it is also possible to provide another contactless heating means, such as, for example, an infrared heater with rays directed onto the rim.

The edge-folding slide preferably has a thermal insulating element against its holder on the edge-folding system. In this way the heating and/or cooling means, which is disposed in the edge-folding slide, is thermally insulated relative to the holder on the edge-folding system. Preferably a plastic structural element is used as the insulating element. However, a cross-sectional taper in the case of metal material may act in insulating manner.

In order to be able to deal with partly very complex three-dimensional molded parts to be edge-folded, it is proposed that various heating and/or cooling means be provided for various edge portions of the substrate part to be taken up with rim to be edge-folded of a decorative layer. In this way the various portions along the rim can be processed differently. Thus, for example, for small radii or in corner regions, which in practice prove extremely difficult to fix mechanically, a conventional edge-folding mechanism may be additionally provided, for example with a hot-air heater and an edge-folding slide, which preferably is likewise heatable but in any case coolable.

Existing edge-folding systems may be retrofitted relatively easily by providing edge-folding slides according to the invention. According to a further aspect of the invention presented here, a method for the retrofitting of an edge-folding system with edge-folding slides therefore accomplishes the stated task, wherein the edge-folding system is set up to execute the method described in the foregoing or wherein the edge-folding system is provided with the features described in the foregoing.

It will be understood that the mechanical advantages that the invention enables extend directly to an interior trim part, which has been manufactured as described in the foregoing, for a motor vehicle.

Figure 4:
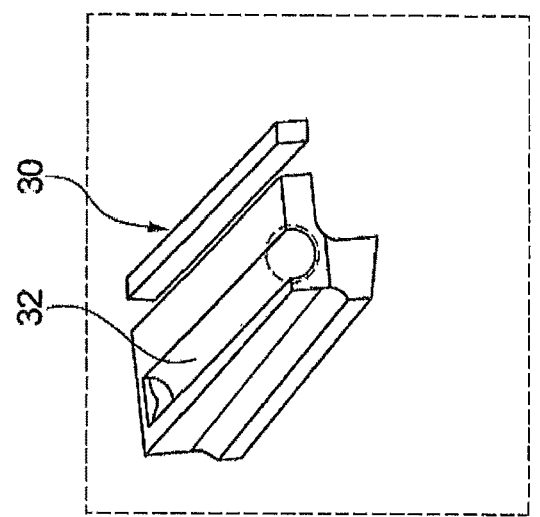
Figure 3:
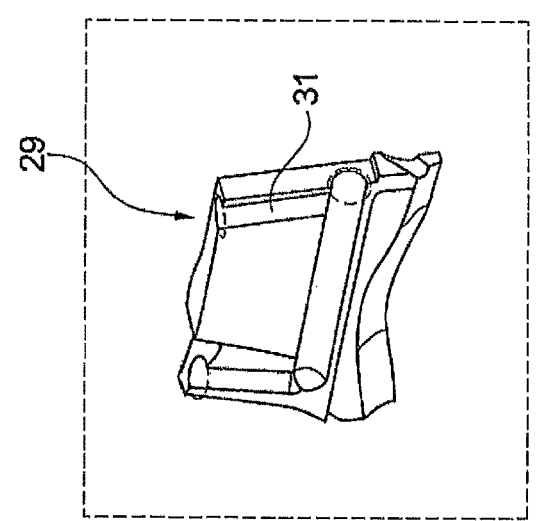
Figure 2:
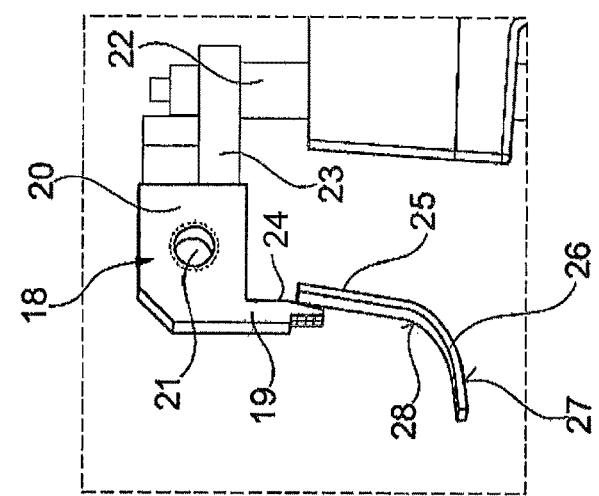
Figure 5:
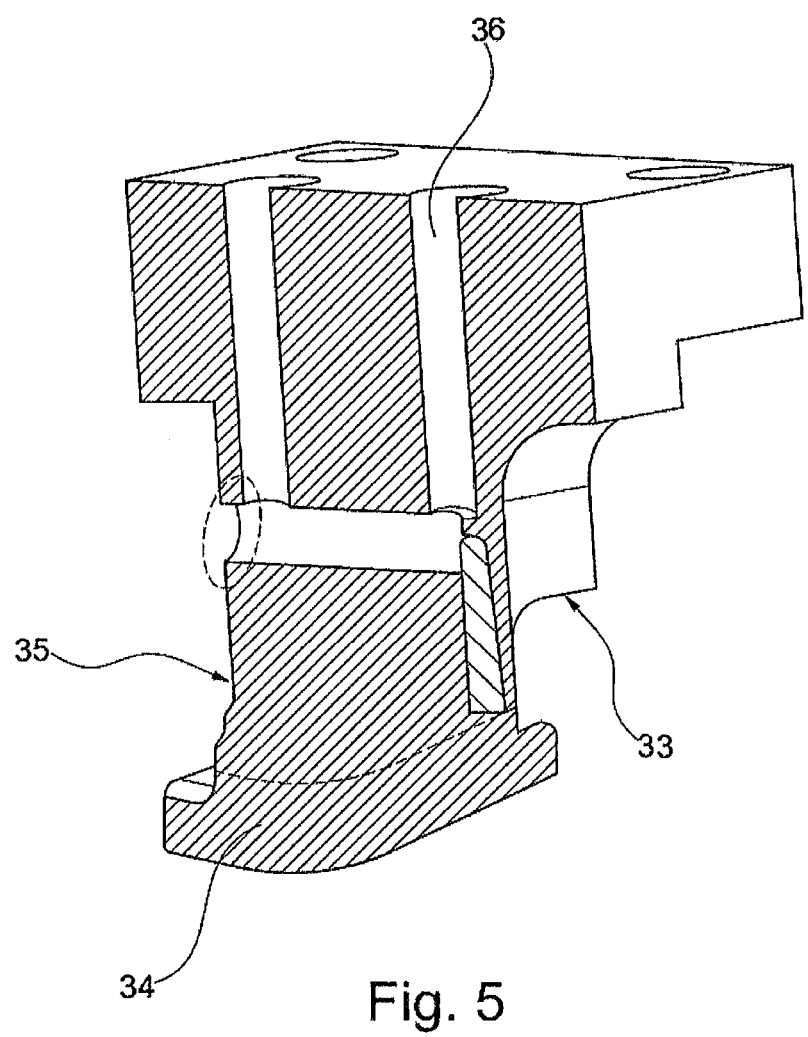

The invention will be explained in more detail hereinafter on the basis of an exemplary embodiment with reference to the drawing, wherein FIG. 1 schematically shows an edge-folding slide unit with a 3D slide head, in a section with the section plane of the movement plane of the slide head, according to the prior art, FIG. 2 schematically shows, in a spatial view, a section region between two section planes of an edge-folding slide according to the invention presented here, FIG. 3 schematically shows, in spatial view of a section, an adhesive jaw with U-shaped temperature-regulating bore, FIG. 4 schematically shows, in a spatial view of a section, an adhesive jaw with a uniaxial temperature-regulating bore and FIG. 5 schematically shows, in a spatial view of a section, a corner slide with U-shaped temperature-regulating channel.

The edge-folding slide unit 1 in FIG. 1 consists substantially of a system-side unit 2 and the slide head 3.

The system-side unit 2 has on the one hand means 4 for connection to a machine frame (not illustrated) of the system, on the other hand an x-carriage 5, driven by an x-cylinder 6, as well as a y-cylinder 7 mounted on the x-carriage 5. Ultimately a carrier 8 for the slide head 3 is present on the y-cylinder 7. The slide head 3 is fixed detachably to the carrier 8.

The edge-folding unit is in active communication with a controller (not illustrated) on the edge-folding system, so that the controller can actuate both the x-cylinder 6 and the y-cylinder 7 in respectively both axial directions. Thus the controller can move the slide head 3 as desired in x-y direction within the predetermined maximum movement limits.

The slide head 3 has, on its side facing away from the region of fastening with the carrier 8, an adhesive jaw 9. This is designed for the engagement with the workpiece:

In the operation of the edge-folding system, the edge-folding slide unit 1 is programmed such that it can press a rim 10 to be edge-folded of a decorative layer 11 onto a stable substrate part 12 with a bend 13 to be tightly turned down. An adhesive joint 14 is formed between the rim 10 of the decorative layer 11 and the substrate part 12. A hot melt is provided in the adhesive joint 14. This can have been applied either onto the inside of the rim 10 or onto the outside of the substrate part 12 or onto both, before the rim 10 of the decorative layer 11 was brought together with the substrate 12 for the fixing.

The activation of the hot melt takes place by heat supply. For example, temperature can be directed via a hot-air system toward the adhesive, so that it softens and acquires its sticky property. Then the slide head 3 is pushed forward by way of the x-cylinder 6 and y-cylinder 7 in a first step 15 in x-direction, so that the adhesive jaw 9 arrives on the pressure side of the substrate part 12. In a second step 16, the edge-folding unit 1 allows the adhesive jaw 9 to execute a return stroke in y-direction, and finally, in a third step 17, the pressing stroke, which applies pressure between the adhesive jaw and the substrate part 12, thus also onto the rim 10 of the decorative layer 11 and the adhesive joint 14.

In this pressed position, the edge-folding slide unit 1 allows the adhesive jaw 9 to remain in place until an adhesion effect has developed between the rim 10 and the substrate part 12. Ideally this takes place as a result of a cooling according to a possible further aspect of the invention presented here. This shortens the dwell time.

As soon as it can be assumed that the rim 10 will still remain in the firmly adhered and thus fixed position on the substrate part 12 after a removal of the adhesive jaw 9, the three steps 15, 16, 17 are executed in inverse sequence, so that the slide head 3 is again disposed in its starting position and the substrate part 12 with the edge-folded decorative layer 11 can be removed from the working position and from the system. Then a new substrate part with new decorative layer can be inserted.

The adhesive jaw 18 in FIG. 2, equipped according to the invention, consists substantially of a pressing part 19 and a temperature-regulating block 20.

A channel 21, which was bored, eroded or lasered, for example, is disposed in the temperature-regulating block 20.

The adhesive jaw 18 equipped according to the invention is formed from a one-piece metal element, which contains both the pressing part 19 and the temperature-regulating block 20. The metal is preferably of high thermal conductivity and, for example, comprises copper and/or beryllium.

Relative to a y-cylinder 22, as may be provided in the prior art, a thermally insulating connection is made by way of a plastic holder 23.

The pressing part 19 is preferably three-dimensionally contour-milled on its pressing side 24 and thus fits optimally against the edge 25 of the substrate part 26, around which the decorative layer (not illustrated in FIG. 2) will be edge-folded. This leads, moreover, to the best possible full-surface temperature transmission between the pressing side 24 of the pressing part 19 and the substrate part 26 on the region discretely contacted and thus pressed by the adhesive jaw 18 equipped according to the invention. A rim of the decorative layer turned down from a viewing side 27 of the substrate part 26 around the edge 25 toward the rear side 28, which in the later insertion of substrate part 26 lies hidden, can therefore be pressed on perfectly with hot melt.

Already during the edge folding of the rim of the decorative layer around the edge 25, alternatively only later, but in any case during the pressing of the edge-folded rim around the edge 25, or alternatively only before the edge folding of the rim around the edge 25, a hot liquid can be pumped through the channel 21. This leads to an assisted activation of the hot melt.

Already during the edge folding around the edge 25, alternatively only after the pressing of the edge-folded rim around the edge 25 onto the back side 28, a cooling liquid can be pumped through the channel 21, which leads to a solidification of the hot melt.

When the cooling fluid is pumped through the channel 21, the dwell time of the adhesive jaw 18 equipped according to the invention can be regularly shortened without having to fear that the edge-folded rim will be lifted from its fixed position when the pressing pressure is relaxed by the adhesive jaw 18 equipped according to the invention, above all when the adhesive jaw 18 is retracted, in order to release the workpiece for removal.

A first alternative edge-folding slide 29 in FIG. 3 has three respectively linear bores, which altogether comprise a U-shaped channel 31, which likewise is usable both for cooling means and for heating means.

A linear channel 32 is provided in the second alternative edge-folding slide 30.

An edge-folding slide with one channel may also be produced by the fact that milled or otherwise machined channels or partial channel circumferences are disposed in individual workpieces and the pieces are then brought sealingly together.

The same principle can be employed for a corner slide 33: an adhesive jaw 35 formed with a corner 34 or at least a narrow radius is likewise in direct active communication with a U-shaped channel 36 shown by way of example here.

REFERENCE SYMBOLS

1 Edge-folding unit
2 system-side unit
3 Slide head
4 Connecting means
5 x-Carriage
6 x-Cylinder
7 y-Cylinder
8 Carrier
9 Adhesive jaw
10 Rim
11 Decorative layer
12 Substrate part
13 Bend
14 Joint gap
15 1st step
16 2nd step
17 3rd step
18 Adhesive jaw equipped according to the invention
19 Pressing part
20 Temperature-regulating block
21 Channel
22 y-Cylinder
23 Plastic holder
24 Pressing side
25 Edge
26 Substrate part
27 Viewing side
28 Rear side
29 First alternative edge-folding slide
30 Second alternative edge-folding slide
31 U-shaped channel
32 Linear channel
33 Corner slide
34 Corner
35 Adhesive jaw
36 Channel

The invention claimed is:

1. A method for the folding of a rim of a decorative layer around an edge of a substrate part, the method comprising:
    folding the decorative layer rim around the substrate part edge using an edge-folding slide;
    fixing the rim of the decorative layer in the edge-folded condition in an adhesive joint;
    actively heating the edge-folding slide during the edge folding and/or during the fixing of the rim of the decorative layer; and
    actively cooling the edge-folding slide.

2. The method of claim 1, wherein the edge-folding slide is cooled from its inside outward by pumping a cooling fluid through a channel on or in the edge-folding slide, so that the edge-folding slide is flowed through by the cooling fluid and thereby cooled.

3. The method of claim 2, wherein a cooling regulating circulation is provided and the cooling is regulated with respect to the circulation's amount and/or its flow and/or its cooling capacity and/or its cooling position.

4. The method of claim 3,
    wherein a return-flow temperature of the cooling fluid is measured as the regulating value, and
    wherein the return-flow temperature is regulated to a value below 40° C.

5. The method of claim 1, wherein the edge-folding slide is first cooled to below 40° C. before it is removed from the edge-folded rim.

6. The method of claim 1, wherein the edge-folding slide is heated from its inside outward by pumping a heating fluid through a channel in the edge-folding slide, so that the edge-folding slide is flowed through by the heating fluid and thereby heated.

7. The method of claim 1, wherein a metallic structural element is used for the edge-folding slide.

8. The method of claim 7, wherein the metallic structural element comprises copper and/or beryllium.

9. The method of claim 1, wherein the edge-folding slide is formed in one piece with an open or closed channel.

10. The method of claim 1, wherein a same liquid medium is used for the cooling and the heating.

11. The method of claim 1, wherein a heating fluid and a cooling fluid are provided and are pumped in alternation through a same channel on or in the edge-folding slide.

12. The method of claim 1, further comprising:
    a) edge-folding of the rim and pressing of the rim against the substrate part by way of the edge-folding slide;
    b) heating the edge-folding slide to activate thermally activatable adhesive in the adhesive joint;
    c) holding of the rim in the pressed condition of the thermally activatable adhesive;
    d) cooling the edge-folding slide to cool the thermally activatable adhesive, so that the cooling of the thermally activatable adhesive fixes the edge-folded rim to the substrate part;
    e) detaching of the edge-folding slide from the rim fixed on the substrate part.

13. The method of claim 1, wherein the edge folding of the rim takes place at a temperature level at the point of contact with the edge-folding slide below an activation temperature of a thermally activatable hot melt used to fix the rim in the edge-folded condition.

14. The method of claim 1, wherein the heating takes place during exertion of the pressure of the edge-folding slide on the rim and on the thermally activatable adhesive on the substrate part.

15. The method of claim 1, wherein the cooling takes place during exertion of the pressure of the edge-folding slide on the rim and on the adhesive on the substrate part.

16. An edge-folding system for the edge folding of a rim of a decorative layer around an edge of a substrate part, the system comprising:
   an electromechanically driven edge-folding slide configured to perform edge folding;
   a fixing means configured to fix the rim of the decorative layer in an adhesive joint in the edge-folded condition;
   an active heating means for the edge-folding slide configured to heat the edge-folding slide during the edge folding and/or during the fixing of the rim of the decorative layer; and
   an active cooling means for the edge-folding slide configured to cool the edge-folding slide for the fixing of the rim of the decorative layer by way of the active cooling means.

17. The edge-folding system of claim 16, wherein a cooling circulation for a cooling fluid is provided.

18. The edge-folding system of claim 17, wherein the cooling circulation and the heating circulation are connected in series.

19. The edge-folding system of claim 17, wherein the cooling circulation and the heating circulation are connected in parallel.

20. The edge-folding system of claim 16, wherein a heating circulation for a heating fluid is provided.

21. The edge-folding system of claim 16, wherein the edge-folding slide has an electrically and/or magnetically activatable heating element and wherein the edge-folding system is set up to activate the heating element for the edge folding and/or for the fixing.

22. The edge-folding system of claim 16, wherein a hot-air system is provided and set up to direct a hot-air stream onto a region of the adhesive joint of the substrate part, taken up for edge folding, with the rim to be edge-folded of the decorative layer, with a multiplicity of discrete hot-air outlet openings disposed substantially in the shape of the substrate-part contour.

23. The edge-folding system of claim 16, wherein a contactless heating means is provided for the rim of the decorative layer and/or an adhesive in the adhesive joint.

24. The edge-folding system claim 16, wherein the edge-folding slide has a thermal insulating element attached to an opposite end of an adhesive jaw as a pressing part of the adhesive jaw on the edge-folding system.

25. The edge-folding system of claim 16, wherein various heating and/or cooling means are provided for various edge portions of a substrate part to be taken up with rim to be edge-folded of a decorative layer, the heating and the cooling means using the same medium for at least one edge portion.

* * * * *